(12) United States Patent
Sheng

(10) Patent No.: US 9,665,600 B2
(45) Date of Patent: May 30, 2017

(54) METHOD FOR IMPLEMENTING DATABASE

(71) Applicant: Jie Sheng, Shenzhen (CN)

(72) Inventor: Jie Sheng, Shenzhen (CN)

( * ) Notice: Subject to any disclaimer, the term of this patent is extended or adjusted under 35 U.S.C. 154(b) by 77 days.

(21) Appl. No.: 14/385,872

(22) PCT Filed: Nov. 29, 2013

(86) PCT No.: PCT/CN2013/088207
§ 371 (c)(1),
(2) Date: Sep. 17, 2014

(87) PCT Pub. No.: WO2015/074290
PCT Pub. Date: May 28, 2015

(65) Prior Publication Data
US 2015/0261793 A1   Sep. 17, 2015

(30) Foreign Application Priority Data

Nov. 22, 2013   (CN) .......................... 2013 1 0597381

(51) Int. Cl.
*G06F 17/30* (2006.01)

(52) U.S. Cl.
CPC .. *G06F 17/30289* (2013.01); *G06F 17/30339* (2013.01)

(58) Field of Classification Search
CPC ......... G06F 17/30339; G06F 17/30289; G06F 8/42; G06F 8/72; G06F 8/80
(Continued)

(56) References Cited

U.S. PATENT DOCUMENTS 5,991,765 A    11/1999  Vethe
7,831,629 B2 *  11/2010  Simison et al. ............. 707/802
(Continued)

FOREIGN PATENT DOCUMENTS

| CN | 1652112 A | 8/2005 |
|---|---|---|
| CN | 1825306 A | 8/2006 |
| CN | 103106198 A | 5/2013 |

OTHER PUBLICATIONS

Takashi Nozawa et al., A Development Framework for Mobile User-Interfaces Based on HTML Centric Dependency Injection, 2008, IEEE, vol. 3, 186-189.*

(Continued)

*Primary Examiner* — Jean B Fleurantin
(74) *Attorney, Agent, or Firm* — Hovey Williams LLP

(57) ABSTRACT

The present invention provides a method for implementing a database, comprising: encoding, uniquely and respectively, tables, fields, and data relationships between the tables provided according to a predefined rule; storing codes of the tables, codes of the fields, and codes of the data relationships obtained in a created code structure table of node cluster to form code nodes; forming subordination mappings between the codes of the tables, the codes of the fields, and the codes of the data relationships in the code structure table of node cluster, according to subordination relationships between the tables, the fields and the data relationships; and mapping a name corresponding to each of the codes in a created comparison table of node cluster value; wherein code sub-nodes having unique codes are created under a code node corresponding to the fields, and data elements are stored in a storage space corresponding to the code sub-node. Accordingly, when addressing any table, field and data element, only one addressing and acquisition is made through the unique code of the table, the field and the data element to be addressed, thus the addressing efficiency of database can be improved.

8 Claims, 1 Drawing Sheet

(58) Field of Classification Search
USPC .......................................................... 707/803
See application file for complete search history.

(56) References Cited

U.S. PATENT DOCUMENTS

2007/0174322 A1* 7/2007 Simison et al. .............. 707/102
2010/0232288 A1* 9/2010 Coatney et al. .............. 370/221

OTHER PUBLICATIONS

International Search Report and Written Opinion dated May 30, 2014, All pages.

* cited by examiner

METHOD FOR IMPLEMENTING DATABASE

RELATED APPLICATIONS

This application is a national stage application, under 35 U.S.C. §371, of International Application No. PCT/CN2013/088207, filed Nov. 29, 2013, which claims priority to Chinese Application No. 201310597381.1, filed Nov. 22, 2013, with both above-identified applications incorporated by reference herein in their entireties.

TECHNICAL FIELD

The present invention relates to the technical field of database, more particularly, to a method for implementing a database.

BACKGROUND ART

Database is a warehouse used to organize, store and manage data. A database in the conventional art is generally encoded, designed and implemented by taking a 'table' as the central part and a 'field' as a basic unit.

When a database is implemented in the conventional technology through encoding, a table name is first obtained through analysis; the table name is encoded and a table is created according to the table name and the code. Then a field name is acquired and encoded, and a field name is created in the table structure accordingly created.

In the method for implementing database in the conventional art, each data element is converted via a path of "table name"."field name" through encoding and "addressed" to a storage space after being encoded twice. After that the "data element" is stored in a specified recording space, wherein a third encoding is made to "record" stored by the data element when storing the data element.

In the method for implementing database in the conventional art, the encoding of the tables, the encoding of the fields and the encoding of the records are made respectively independent of each other and different codes may be repeated. When a specified data element is being addressed, a plurality of code conversions is required and dispersive addressing is need, making the addressing speed slow.

DISCLOSURE OF THE INVENTION

An object of the present invention is to provide a method for implementing a database so as to solve the above problems.

Embodiments of the present invention provide a method for implementing a database, comprising the following steps:

encoding, uniquely and respectively, tables, fields, and data relationships between the tables provided according to a predefined rule;

storing codes of the tables, codes of the fields, and codes of the data relationships obtained in a created code structure table of node cluster to form code nodes;

forming subordination mappings between the codes of the tables, the codes of the fields, and the codes of the data relationships in the code structure table of node cluster, according to subordination relationships between the tables, the fields and the data relationships; and mapping a name corresponding to each of the codes in a created comparison table of node cluster value, the name comprising names of the tables, names of the fields or names of the data relationships;

wherein code sub-nodes having unique codes are created under a code node corresponding to the fields, and data elements are stored in a storage space corresponding to the code sub-nodes.

In the method for implementing database provided by the embodiments of the present invention, the tables, the fields, the data relationships and the data elements are encoded uniquely and respectively, and stored in a unified way in one address space, i.e., in the created code structure table of node cluster and comparison table of node cluster value. In such way, when any table, field or data element is addressed, only one addressing and acquisition is made through the unique code of the table, the field and the data element to be addressed, thus improving the addressing efficiency of the database.

DETAILED DESCRIPTION OF EMBODIMENTS

Figure 1:
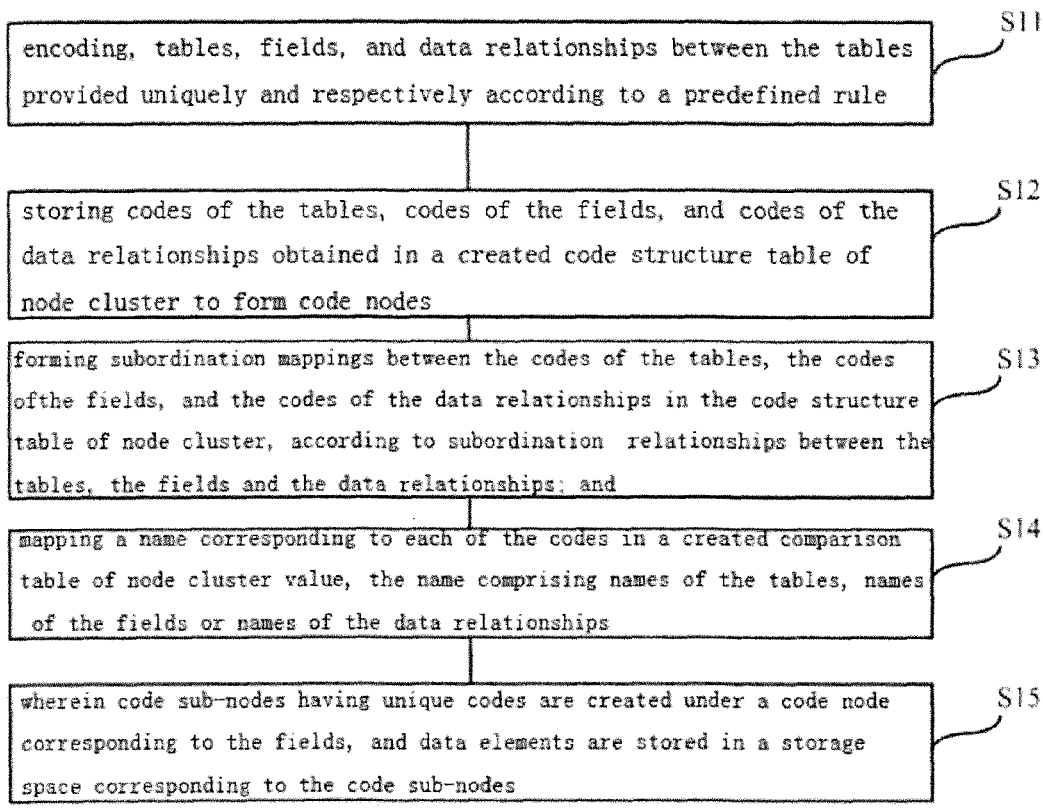
FIG. 1 illustrates a flow chart of a method for implementing a database according to an embodiment of the present invention.

In the following, the present invention will be further described in detail through specific embodiments in conjunction with the FIGURE.

An embodiment of the present invention provides a method for implementing a database. As illustrated in FIG. 1, the method generally comprises the following steps:

Step S11: encoding tables, fields, and data relationships between the tables provided uniquely and respectively according to a predefined rule;

Step S12: storing codes of the tables, codes of the fields, and codes of the data relationships obtained in a created code structure table of node cluster to form code nodes;

Step S13: creating subordination mapping between the codes of the tables, the codes of the fields, and the codes of the data relationships in the code structure table of node cluster, according to subordination relation between the tables, the fields and the data relationships;

Step S14: mapping a name corresponding to each of the code in a created comparison table of node cluster value, the name including names of the tables, names of the fields or names of the data relationships;

Step S15: code sub-nodes having uniquely code are created under code nodes corresponding to the fields, and data elements are stored in a storage space corresponding to the code sub-nodes.

In the method for implementing a database provided by the embodiment of the present invention, the tables, the fields, the data relationships and the data elements are encoded uniquely and respectively, and stored in a unified way in one address space, i.e., in the created code structure table of node cluster and comparison table of node cluster value. In such way, when any table, field or data element is addressed, only one addressing and acquisition is made through the unique code of the table, the field and the data element to be addressed, thus improving the addressing efficiency of the database.

The method for implementing a database according to the embodiment of the present invention further comprises a step of adding one or more of new tables, new fields, and new data relationships; further comprises a step of directly addressing tables, fields or data relationships to be deleted according to the created code nodes, and clearing data space occupied by the addressed tables, fields and data relationships to be deleted; further comprises a step of directly addressing tables, fields or data relationships to be changed according to the created code nodes, and correspondingly modifying information in data space occupied by the addressed tables, fields and data relationships to be changed.

Specifically, the step of adding one or more of new tables, new fields, and new data relationship comprises:

encoding tables, fields, and data relationship to be added uniquely according to the predefined rule to obtain newly added codes;

adding the newly added code into the comparison table of node cluster value, and forming subordination mapping between the newly added codes of the added tables, the newly added codes of the added fields, and the newly added codes of the added data relationships in the code structure table of node cluster, and mapping a name corresponding to each of the newly added codes in the created comparison table of node cluster value.

In the embodiment of the present invention, the step of encoding tables, fields, and data relationships between the tables provided uniquely and respectively according to predefined rule comprises encoding in sequential integers from small to large according to the same encoding rule when encoding the tables, the fields, and the data relationships between the tables provided.

Further, the step of encoding tables, fields, and data relationship to be added uniquely according to predefined rule to obtain newly added code comprises acquiring the maximum value of the current integer codes in the database, increasing the acquired maximum value of the current integer codes by a preset step as an initial value of newly added codes, and encoding the tables, the fields, and the data relationships to be added in sequential integers from small to large using the initial value to obtain newly added codes.

In the embodiment of the present invention, there are many implementation manners for adding the newly added code into the comparison table of node cluster value. Several examples will be given by the present invention, specifically comprise:

creating new code nodes in the comparison table of node cluster value using the newly added code obtained, so as to add the newly added codes into the comparison table of node cluster value; or creating new code sub-nodes under the created code nodes using the newly added code obtained, so as to add the newly added codes into the comparison table of node cluster value; or creating new subordination sub-nodes under the created code sub-nodes using the newly added code obtained, so as to add the newly added codes into the comparison table of node cluster value.

Further, the method for implementing a database provided by the embodiment of the present invention further comprises a step of performing database encoding operation on a table in HTML format provided by a user, wherein the step of performing database encoding operation on the table in HTML format provided by a user comprises: capturing table elements of the table in HTML format, wherein the table elements comprises a table name element, a data segment element, a data element and a data relationship element; creating a pool for data to be converted according to the captured table elements; scanning all the elements in the pool for data to be converted, and creating unique codes in the code structure table of node cluster for each of the elements, forming mapping relationships between the created codes, at the same time, mapping names corresponding to each code in the comparison table of node cluster value.

In the embodiment of the present invention, the step of performing database encoding operation on a table in HTML format provided by a user further comprises: when addition, deletion or change of data fields or data elements by a use is detected, adding a new code, deleting a specified code and data in space corresponding to the specified code, or modifying data in a specified code storage space correspondingly in the code structure table of node cluster and the comparison table of node cluster value.

The method for implementing a database provided by the embodiment of the present invention further comprises: directly addressing and obtaining corresponding tables, fields, data relationships or data elements according to the created code nodes, and calculating according to a predefined rule using the addressed tables, fields, data relationships and data elements.

In the following, the method for implementing a database provided by the embodiment of the present invention will be further described through comparison with the method for implementing a database according to conventional arts.

When a database is created using the method for implementing a database according to the conventional art, variations of a table or a field in the database generally comprise the following cases:

Case 1: "adding", "deleting" and "renaming" of a "table"

(1) When a "table" is being added, a new separate "table space" corresponding to a "table code is created, and a "table name" for the added table which is not the same as an existing table is defined, and the "table name" is used as a future path of data storage and computation.

(2) When a "table" is being deleted, the existing method for implementing a database performs the following operation: addressing a corresponding table space by mapping a "table code" to a "table name", and comparing the "table code" one by one to the definition of "table collection", clearing records matching the "table code"; at the same time, marking and clearing space record occupied by the "table code" for reoccupation by a new "table", "field", "data element".

(3) When "renaming" a "table", the existing method for implementing a database is as follows: mapping to a "table code" through a "table name", addressing to a corresponding table space, amending definition of the "table name" in this code record from the definition of "table collection".

Case 2: "adding", "deleting", "renaming" and "changing type" of a "field"

(1) When a "field" is being added, a "table space" is addressed by mapping a "table code" to a "table name" and then the trailer field is retrieved, followed by creating a new "field space", and then "naming" it and allocating a "table code".

(2) When "deleting" a "field", a "table space" is addressed by mapping a "table code" to a "table name", then a "field space" is addressed by mapping a "field code" to a "field name"; a record of the code field name is deleted from the definition of "field collection", and all records under the field name is marked and deleted for reoccupation by a new field and a data element.

(3) When "renaming" and "changing type" of a "field", a "table space" is addressed by mapping a "table code" to a "table name", next a "field space" is addressed by mapping a "field code" to a "field name"; after that the type and name of the record of the field name in the "field collection" is modified; when modifying the type, all data elements under this field is addressed and converted one by one.

In the conventional database encoding method, when calculation is to be made, firstly a plurality of "calculation table names" to be calculated is obtained through analysis of the calculating range. The table names are then mapped and obtained through "code set of table names". After that a plurality of "calculation field names" relating to calculation in each table is analyzed and mapped and obtained through "code set of fields". At first, data records corresponding to these "calculation table names" and "calculation field names" are stored dispersedly, which is referred to as "disperse calculation records set". Then, in the "disperse calculation records set", the connection relationship between tables are analyzed, range of conditions in the records are analyzed, and then these "disperse calculation records set" are read out and consolidating into a "consolidated calculation records set" through "relationship connection" and "records selection". Finally a new "calculation result records set" is obtained through corresponding operations.

(1) The first disadvantage of the conventional database coding method: encoding of a table, encoding of a field and encoding of a record are made independent of each other, and storage is also separately performed; moreover, codes may be repeated. In this case, when addressing a data element, a plurality of code conversions and disperse addressing are required and the addressing speed is slow. At the same time, the "table name" and "field name" to be addressed are both "string", and multiple "comparison" operations are needed when addressing, making the addressing speed being slow.

(2) The second disadvantage of the conventional database coding method: manual configuration of the database at the background is required for both adding, deleting and changing of a table and adding, deleting and changing of a field, and a new table code and field code are needed, that is, no flexibility exists in database in respective of the design of tables and fields.

(3) The third disadvantage of the conventional database coding method: manual configuration of the database at the background is required for both adding, deleting and changing of a table and adding, deleting and changing of a field. As such code cannot be created and obtained automatically through program, y a second-time encoding and development of the calculation program is usually required after the table and field change, making the computer program lack flexibility.

(4) The fourth disadvantage of the conventional database coding method: after the table and the field are defined, data elements are in the form of matrices. However, it does not need to store data element in all record rows of the fields, which will result in waste of storage space. Such waste is caused by storage in the form of matrices according to the conventional database encoding method.

(5) The fifth disadvantage of the conventional database coding method: in terms of computation efficiency, each time the calculation range is determined, conversion of a plurality of table codes and conversion of a plurality of field codes are required. Moreover, data records set to be calculated is addressed in dispersed storage space; the more tables related to the calculation is, the lower the addressing efficiency of calculation records set will be. The number of I/O of a computer exhibits linear or even exponential growth with the increasing of the number of tables related to the calculation scope, while I/O numbers is an important index for calculation efficiency. The larger the I/O number is, the lower the addressing efficiency is; the small the I/O number is, the higher the addressing efficiency is. Eventually, with expansion of data scale and calculation range, calculation efficiency of the traditional database coding method will decrease.

(6) The sixth disadvantage of the conventional database coding method: when storing data, no code reuse structure is available for definition reuse of tables, fields, data records and data structures which may be reused. This makes the reuse rate of data in terms of the structure low. Moreover, maintenance of the reuse structure is difficult as no uniform encoding exists.

The main differences between the method for implementing a database according to the embodiment of the present invention and the existing method for implementing a database are as follows:

(1) In the method for implementing a database according to the embodiment of the present invention, a unique and unrepeatable integer code will be created first for any meaningful element (including a table, a field, or a data element). After that, using significance of the created code will be defined freely based on the created code. The process of the definition of using significance of the created code is a process which starts with an empty node completely free of directing significance and then continually attributing a table, a field, a data element or a relationship to this code.

In the conventional method for implementing a database, the purpose of a definition has to be determined first. If a table is to be defined, encoding is made in the tables set; if a field is to be defined, encoding is made in the fields under a specific table space; if a relationship is to be defined, encoding is made in a specific relationship container. The process of defining the existing data coding is a process which starts with creating a node having practical directing significance in a pre-determined meaningful real space and then uses as needed under the rules of the container.

It can be seen that any data node in the conventional method for implementing a database can only be created once, and fixed growth relationships and records are created along one direction. However, any code node in the method for implementing a database in the embodiment of the present invention can be created freely and defined for a second time, and new growth relationships and related records can be created in any direction.

Furthermore, in the existing method for implementing a database, usage of a table, field and data element is a process of comparative addressing, reading records and calculating by taking a table name, a field name and a record value attribute as a path. However in the embodiment of the present invention, usage of a table, field and data element is a process of direct addressing, direct reading records and direct calculating by using an integer code as an essential part.

As for program reference, in the existing database coding, reference to a table, field and data element must specify a specific table name, field name, record value attribute, and locate one by one in a plurality of disperse storage spaces. However, in the method for implementing a database in the embodiment of the present invention, reference to a table, field and data element can be directly located at once in the same storage space according to the created code only.

In the embodiment of the present invention, Universal Only integer-Code In DataBase (UOCID) is made to each table, field, data element and relationship, individual UOC-IDs do not repeat with each other, and are stored in a unified way in one address space. In the existing same address space, the UOCIDs are stored according to the order of UOIC. As a result, addressing of any table, field, data element and data set can be made for once through the only UOCID. Meanwhile logic code order of the UOCID code is consistent with physical storage sequence, therefore target data can be extracted at one time, without location twice through index. As a result, the addressing efficiency is high and the addressing speed is fast.

In the method for implementing a database in the embodiment of the present invention, adding, deleting and changing of a table and adding, deleting and changing of a field do not require manual configuration of the database at the background. Instead, a new code is automatically increased according to the way of "UOCID current maximum code number+1". Alternatively, the new code is activated in the way of "UOCID current free code". Therefore, the UOCID code system allows increasing of design flexibility of a table and field.

In the method for implementation a database in the embodiment of the present invention, adding, deleting and changing of a table and adding, deleting and changing of a field may be done by creating and obtaining, UOCID code automatically through the program, therefore allowing computer programs to make dynamical definition when adding, deleting and changing of a table or field. Definition of the table or field may be mapping dynamically into UOCID code for a user to define, improving flexibility of the program code, and reducing dependence on IT technology person when developing for a second time.

In the method for implementing a database in the embodiment of the present invention, the data can to be stored as required in any dimension of the table and the field, and storage of the data element is stored in the way of "UOCID code+compact queue", rather than storage in a form of matrix, reducing the waste of the storage space.

In the method for implementing a database in the embodiment of the present invention, in terms of computation efficiency, it is related to code conversion of only one table for UOCID code every time the calculation range is decided; meanwhile, data record set to be calculated is addressed in the same storage space. Furthermore, data extraction is made through integers consistent with physical storage sequence at the same time with addressing. Thus addressing of only one code table is involved, no matter how large the calculation range is, which greatly reduces I/O numbers of a computer when calculating. I/O number is an important index for calculation efficiency. The larger the I/O number is, the lower the addressing efficiency is; the smaller the I/O number is, the higher the addressing efficiency is. The method for implementing a database in the embodiment of the present invention achieves expansion of data scale and calculation scope, having very low impact on calculation efficiency, and having obvious computation advantages, especially in the aspect of mass calculation.

In the method for implementing a database in the embodiment of the present invention, in terms of data storage, UOCID code can make reuse definitions on reusable tables, fields, data records and data structures, achieving high reuse rate of data on the structure. Meanwhile, UOCID is a unified and unique code, so it is easy to maintain the reuse structure.

In the method for implementing a database in the embodiment of the present invention, a UOCID data reference replacement pool is automatically formed in the process of creating database, for a program to automatically calling and switching.

Program implementation of the data reference replacement pool is further provided by the embodiment of the invention, for example:

Before UOCID conversion: a "SELECT * FROM purchase table" is directly pointing to a purchase table.

After the UOCID conversion:

the purchase table is automatically renamed to "PRE purchase table".

The UOCID code structure table and UOCID value table are automatically mapped or a new temporary table is generated, the name of the new table is consistent with the actually used name, which is purchase table.

The "SELECT * FROM purchase table" will be created on a mapped table or temporary table after UOCID encoding.

Before the UOCID conversion: "INERT INTO VALUE" into purchase table.purchaser directly adds one line.

After the UOCID conversion:

the purchase table is automatically renamed to "PRE purchase table".

The UOCID code structure table and UOCID value table are automatically mapped or a new temporary table is generated, the name of the new table is consistent with the actually used name, which is purchase table.

"INERT INTO VALUE" into purchase table.purchaser will perform two kinds of operations:

directly entering the purchase table and automatically adding one line, for example, a record of "purchaser=Zhang San";

at the same time entering a UOCID code table and automatically adding one line, for example, a record of "78880xx BEOF 7888002", and entering a UOCID cluster value table and automatically adding one line, for example, 78880xx Zhang San.

The following two operations are initial sub-operations. Only in the base of both operations being successful will "INERT INTO VALUE" be regarded as success. Otherwise, either of the operations fails, the whole "INERT INTO VALUE" operation will return a failure.

The method for implementing a database in the embodiment of the present invention can also automatically detect establishment of a new table, a new field, or a new data relationship. If the establishment of a new table, a new field, or new data relationship is detected, unique code is given to the new added table, field and data relationship.

The method for implementing a database in the embodiment of the present invention can perform database encoding operation on a table in HTML format provided by a user. Specifically, the operation comprises the following steps: capturing table elements of the table in HTML format, where the table elements comprises a table name element, a data segment element, a data element and a data relationship element; creating a pool for data to be converted according to the captured table elements; scanning all the elements in the pool for data to be converted and creating unique code in the code structure table of node cluster for each of the element, forming mapping relationship between the created code, at the same time, mapping in the comparison table of node cluster value name corresponding to each code.

Further, the step of performing database encoding operation on the table in HTML format further comprises: marking (setAttribute) all elements on HTML pages with UOCID codes, and automatically embedding all the UOCID codes into a TD\TR tag, wherein UOCID is generated by creating a new attribute.

The step of performing database encoding operation on the table in HTML format further comprises: automatically extending the table in HTML format, and creating a button of an added or changed field; after a new field is input by the user, automatically creating a new UOCID code, and storing it in the UOCID code structure table and the cluster value table.

The method for implementing a database in the embodiment of the present invention can automatically monitor all the tables and fields, automatically convert to UOCID code library and automatically generate new mapping relationships, having no influence on development and reference to database by the existing software. At the same time, HTML elements in an interface are automatically scanned and compared with the UOCID code library, new elements are encoded and created, and returned to the database to form a new mapping, achieving completely unified mapping relationship between the UOCID and the existing database in the aspect of development and reference, so as to expand design flexibility of a table and field.

In the embodiment of the present invention, at an arbitrary existing code node (i.e, UOCID node, such as 381769), a new UOCID code sub-node is applied directly, the node has only one integer code (such as 381776), and therefore does not require any significance. The characteristic of the code is unique and unrepeatable in the entire UOCID code library.

In the embodiment of the present invention, a name having practical significance may be defined at the newly added node, and the name may be a table name, a field name or a data element.

For the newly added UOCID codes, practical significance may be defined for each of the newly added UOCID code, for example, a group of table names and field names.

A new UOCID sub-node is applied at a specific node, and specific data element is defined. For example, actual data records in a purchase order table or actual data records in a supplier list are used as an example to be defined.

Node relationship for an actual data element node can be defined freely to form storage in the form of UOCID+ compact queue. In this example, a group of UOCID nodes correspond to the data element. Meanwhile the group of UOCID nodes can together belong to another one or another group of UOCID nodes.

For each UOCID node code, a node cluster having any significance can be created therebelow, definition of each node cluster, no matter what the structure of the table, field, relation and data element is, can be infinitely extended under each UOCID node. A meaningful UOCID nodes collection having complete meaning is formed, for example, under a UOCID node, a process set, a data set, a section of code instruction set, or even a graph, an interface, a file can be loaded; a most primitive data element, or a value can also be loaded.

According to free extension of the UOCID node code, logic and code lines of the computer program may be matched with the logical structure formed by the UOCID node codes, and a UOCID code value is assigned to each line of instructions of the computer program to form a free UOCID code container.

A UOCID node cluster is formed through the free definition of the UOCID nodes. The node cluster can include the following items having practical significance: table collection, field collection, relationship collection, calculation collection, and instruction structure, interface element, function element, behavior element of the computer program. In the aspect of its storage, it is sequential storage of the integer code of the UOCID, and the relationship corresponds with the description to form a complete UOCID system code.

Each UOCID node code does not need practical significance when being assigned. Sequential storage is made in the storage; the structure relationship and value of each node are corresponding with each other, to form a complete system definition. From the structure to the elements of this complete system definition can be expanded, stored, and defined for a second time freely, as long as it can reflect the actual intent or logic. Elements including data table, data field, code, process and the like can be defined and extended through the UOCID node code. At the same time, its storage is compact, no blank space region is needed either logically or physically to distinguish the relationship between tables and between fields. Instead, they are associated through UOCID structure relationship. In contrast, in the UOCID structure relationship, the integers are all associated, and only a few bytes are used for storage, greatly saving space to be occupied by data tables, fields in storage.

According to the definition of the formed UOCID node cluster, the computer program can perform design, storage, reading and calculation for tables and fields dynamically in the new code system. At the same time, data layer, logic layer and indication layer are integrated in the form of UOCID code, which essentially removes the requirement of pre-coding to tables and fields in the existing database coding method and adopts the requirement of dynamic encoding. In the new UOCID code system, table names and field names are no longer needed for reference to data. Instead code is directly used for reference, achieving infinite flexibility of dynamic definition to tables and fields, achieving fast positioning efficiency of calculation, while further achieving the maximum reuse efficiency of reusable data.

The database formed by the method for implementing a database in the embodiment of the present invention can achieve, in calculation, direct reference to UOCID code address for operation, without reference to the table name+ field name for operation.

In contrast, in the existing database coding technique, it has to address from hundreds of to thousands of tables and from several to dozens of fields of each table, and to compare the data characteristics, which means finding the source data takes multiple I/O reading. The advantage of direct reference and calculation through the UOCID code lies in that the UOCID code can directly locate address of data source when data needs to be extracted to calculate from mass data, thereby greatly improving the efficiency of reading source data.

At the same time, the entire code system can make reference and calculation on the UOCID code, without addressing the table name and field name.

When the database formed by the method for implementing a database according to the embodiment of the present invention is used for calculation, data operation integration may be realized based on a complex cloud system. As an example, if the same kind of data of subordinate enterprises of a corporation, due to historical reasons, is different in format and rules, the traditional database must make complex interface design, with each interface repeatedly performing addressing on tables and fields, which means integrating into a unified interface specification is needed for unified computation. In contrast, in the UOCID code system, as each table, field, data element has unique UOCID code address in the whole cloud system, interface design can be unified, and the source data to be calculated can be addressed with one try, thereby achieving cloud integration of irregular data.

The operation made by the database formed by the method for implementing a database according to the embodiment of the present invention also solves the problem of data reference between different systems of the same enterprise, such as interface reference of data between financial system, ERP system, CRM system, HR system, without complex interface development of the existing database. Instead, only a unified UOCID interface address is required to direct reference and participate in operations across different types of systems.

As to the storage performance comparison between the existing database and UOCID, in terms of mass growth of specific model data, the larger the data size is, the more obvious of the saving of the storage space brought by the UOCID code is. In this example, at the last stage of data growth, the data storage space is saved more than 50%.

In summary, in the method for implementing a database according to the embodiment of the present invention, all elements (tables, fields, data elements, codes, labels and etc.) expressed by a computer are allocated with UOCID codes, the allocated codes are consistent with physical storage sequence; all elements (tables, fields, data elements, codes, labels and etc.) expressed by a computer are stored in the same successive storage space. At the same time, an infinite flexible UOCID code node cluster is allowed to be created under each UOCID node code, and reference to all computer elements can be addressed at one go and obtained directly through the UOCID code, thereby greatly improving efficiency in terms of addressing and computation. Since a way of first application first storage is used for the storage of the UOCID code and value, creation of a node as required and compact storage are implemented, which greatly saves storage space in case of mass growth of data. Furthermore, the UOCID code uses node code as the core, without the limitation of reference to table name and field name, which improves the flexibility of the computer program in creating, adding, deleting or changing a table and in creating, adding, deleting or changing a field. The UOCID code system comprehensively improves the performance of the storage, design and calculation of a computer.

The above is only the preferred embodiment of the invention and does not intend to limit the invention. For a person skilled in the art, the invention may have a variety of changes and modifications. Any change, equivalent replacement, improvement made within the spirit and principle of the present invention should be included in the protection scope of the invention

What is claimed is:

1. A computer-implemented method for implementing a database, characterized by comprising the following steps:
    encoding, uniquely and respectively, tables, fields, and data relationships between the tables provided according to a predefined rule;
    storing codes of the tables, codes of the fields, and codes of the data relationships obtained in a created code structure table of node cluster to form code nodes;
    forming subordination mappings between the codes of the tables, the codes of the fields, and the codes of the data relationships in the code structure table of node cluster, according to subordination relationships between the tables, the fields and the data relationships;
    mapping a name corresponding to each of the codes in a created comparison table of node cluster value, the name comprising names of the tables, names of the fields or names of the data relationships,
    wherein code sub-nodes having unique codes are created under a code node corresponding to the fields, and data elements are stored in a storage space corresponding to the code sub-nodes; and
    performing database encoding operation on a table in HTML format provided by a user, wherein the step of performing database encoding operation on the table in HTML format provided by a user comprises:
        capturing table elements of the table in HTML format, wherein the table elements comprises a table name element, a data segment element, a data element and a data relationship element;
        creating a pool for data to be converted according to the captured table elements;
        scanning all the elements in the pool for data to be converted, and creating unique codes in the code structure table of node cluster for each of the elements, forming mapping relationships between the created codes, at the same time, mapping names corresponding to each code in the comparison table of node cluster value.

2. The method according to claim 1, characterized in that the step of performing database encoding operation on the table in HTML format provided by a user further comprises:
    when addition, deletion or change of data fields or data elements by a user is detected, adding a new code, deleting a specified code and data in space corresponding to the specified code, or modifying data in a specified code storage space correspondingly in the code structure table of node cluster and the comparison table of node cluster value.

3. The method according to claim 1, characterized by further comprising:
    directly addressing and obtaining corresponding tables, fields, data relationships or data elements according to the created code nodes, and calculating according to a predefined rule using the addressed tables, fields, data relationships and data elements.

4. The method according to claim 1, characterized by further comprising: a step of adding one or more of new tables, new fields, and new data relationships;
    further comprising a step of directly addressing tables, fields or data relationships to be deleted according to the created code nodes, and clearing data space occupied by the addressed tables, fields and data relationships to be deleted;
    further comprising a step of directly addressing tables, fields or data relationships to be changed according to the created code nodes, and correspondingly modifying information in data space occupied by the addressed tables, fields and data relationships to be changed.

5. The method according to claim 4, characterized in that the step of adding one or more of new tables, new fields, and new data relationships comprises:
    encoding tables, fields, and data relationships to be added uniquely according to the predefined rules to obtain newly added codes;
    adding the newly added code into the comparison table of node cluster value, and forming subordination mapping between the newly added codes of the added tables, the newly added codes of the added fields, and the newly added codes of the added data relationships in the code structure table of node cluster, and mapping a name corresponding to each of the newly added codes in the created comparison table of node cluster value.

6. The method according to claim 5, characterized in that the step of encoding tables, fields, and data relationships between the tables provided uniquely and respectively according to the predefined rules comprises encoding in sequential integers from small to large according to the same encoding rule when encoding the tables, the fields, and the data relationships between the tables provided.

7. The method according to claim 6, characterized in that the step of encoding tables, fields, and data relationships to be added uniquely according to the predefined rules to obtain newly added codes comprises:
   acquiring the maximum value of the current integer codes in the database, increasing the acquired maximum value of the current integer codes by a preset step as an initial value of newly added codes, and encoding the tables, the fields, and the data relationships to be added in sequential integers from small to large using the initial value to obtain newly added codes.

8. The method according to claim 5, characterized in that the step of adding the newly added codes into the comparison table of node cluster value comprises:
   creating new code nodes in the comparison table of node cluster value using the newly added code obtained, so as to add the newly added codes into the comparison table of node cluster value; or
   creating new code sub-nodes under the created code nodes using the newly added code obtained, so as to add the newly added codes into the comparison table of node cluster value; or
   creating new subordination sub-nodes under the created code sub-nodes using the newly added code obtained, so as to add the newly added codes into the comparison table of node cluster value.

\* \* \* \* \*